United States Patent [19]
Gardenier

[11] 3,782,074
[45] Jan. 1, 1974

[54] PROCESS AND APPARATUS FOR CLEANSING AND PUMPING CONTAMINATED INDUSTRIAL GASES USING A NOZZLE HAVING A VARIABLE THROAT AREA

[75] Inventor: Hugh Emory Gardenier, Tullahoma, Tenn.

[73] Assignee: Aronetics, Inc., Tullahoma, Tenn.

[22] Filed: July 21, 1972

[21] Appl. No.: 273,873

[52] U.S. Cl............................... 55/19, 55/20, 55/94
[51] Int. Cl............................................. B01d 47/10
[58] Field of Search .....55/18–20, 84, 85, 89, 90, 93, 55/210, 222, 223, 228, 257; 239/581, 582

[56] References Cited
UNITED STATES PATENTS

| | | | |
|---|---|---|---|
| 3,613,333 | 10/1971 | Gardenier | 55/89 |
| 3,183,645 | 5/1965 | Teller | 55/20 |
| 2,431,707 | 3/1969 | Berg | 55/20 |
| 2,935,375 | 5/1960 | Boucher | 55/257 |
| 3,385,030 | 5/1968 | Letvin | 55/257 |
| 3,487,620 | 1/1970 | Klein et al. | 55/222 |
| 3,163,173 | 12/1964 | Kuntz | 55/18 |
| 3,420,450 | 1/1969 | Bergholm | 55/87 |

*Primary Examiner*—Charles N. Hart
*Attorney*—Martin Fleit et al.

[57] ABSTRACT

Process and apparatus for removing contaminants from a gas stream by heating a liquid cleansing medium, introducing the liquid cleansing medium into the gas in vaporized and atomized form through a nozzle having a variable throat area, mixing the gas and the high energy cleansing medium thereby entrapping the contaminants, and separating clean gas from the cleansing medium containing the contaminants. The flow rate of the liquid cleansing medium is varied by changing the throat area of the nozzle to thereby control one of the process variables such as the temperature of the liquid.

31 Claims, 4 Drawing Figures

3,782,074

PROCESS AND APPARATUS FOR CLEANSING AND PUMPING CONTAMINATED INDUSTRIAL GASES USING A NOZZLE HAVING A VARIABLE THROAT AREA

BACKGROUND OF THE INVENTION

This invention relates to a process and apparatus for cleaning and pumping contaminated industrial gases.

Many industrial processes require the application of heat to basic materials so that the material can be melted and combined with other substances or purified and refined. Typical of this type of process is steel production and the refining of nonferrous metallic ores. A by-product of these processes is frequently high temperature comtaminated waste gases. For many years, these contaminated industrial waste gases have been discharged to the atmosphere in an uncontrolled manner, but since this is a major identifiable source of air pollution, considerable pressure is presently being exerted to prevent this type of activity. And this problem of air pollution exsts in other industrial processes, not resulting in heated gas discharges.

A process and apparatus for efficiently removing contaminants from industrial gases such that the gases can be discharged into the atmosphere without accompanying air pollution is disclosed in my U.S. Pat. No. 3,613,333, patented Oct. 19, 1971; and my U.S. Pat. No. 3,704,570, patented Dec. 5, 1972, extends this concept.

According to my prior teachings, a liquid cleansing medium is heated, and the heated liquid is introduced into a stream of contaminated gases through an ejector nozzle and under conditions of elevated temperature and pressure such that at least a portion of the liquid is converted to vapor and the remainder is atomized and accelerated by the expansion accompanying the vapor formation. The vaporized and atomized cleansing medium is then mixed with the contaminated gas, thereby entrapping the contaminants in the cleansing medium. A region of reduced pressure relative to the pressure in the source of gas is created by the introduction of the high energy cleansing medium into the stream of gas. This region of reduced pressure aids in developing a draft which induces the flow of gas and its contaminants from the source and into the mixing region without the provision of a fan.

After mixing the vaporized and atomized cleansing medium with the contaminated gas, the mixture is passed to a separator from which the substantially contaminant-free gas is exhausted to the atmosphere or to further processing, and the cleansing medium with its entrapped contaminant particles is discharged from the system. The discharged contaminated cleansing medium then preferably is treated to remove contaminants, and at least a portion is recycled.

The already disclosed ejector nozzle for converting at least a part of the liquid cleansing medium to vapor and atomizing the remaining liquid, is a fixed geometry device. This device performs satisfactorily, but does not have the flexibility to meet changing processing conditions. The purpose of the present invention is to overcome this disadvantage and to add a degree of flexibility to the known system for cleaning and pumping contaminated industrial gases.

It is therefore an object of is invention to provide an improved process and apparatus for efficiently removing contaminants from industrial gases such that the gases can be discharged into the atmosphere without accompanying air pollution.

A still further object of this invention is to provide an improved process and apparatus for efficiently removing contaminants from industrial gases with great flexibility with a high degree of system control.

A still further object of this invention is to provide an improved process and apparatus for efficiently removing contaminants from industrial gases in which the process variables are effectively and efficiently controlled.

A still further object of this invention is to accomplish the above desires by using a nozzle having a variable throat area.

These and other objects will be apparent from the following specification and claims considered together with the accompanying drawings.

SUMMARY OF THE INVENTION

According to one aspect of this invention, a liquid cleansing medium is heated, and the heated liquid is introduced into a flowing gas containing contaminants, with the heated liquid being introduced through a nozzle having a variable throat area and under conditions of elevated temperature and pressure such that at least a portion of the liquid is converted to vapor and a portion is atomized and accelerated by the expansion accompanying the vapor formation. The vaporized and atomized liquid, leaving the nozzle at high velocity, is then mixed with the contaminated gas thereby entrapping the contaminants in the cleansing medium, and at the same time draws contaminated gas from its source without the provision of a fan.

According to another aspect of this invention, an apparatus is provided with which to carry out the above process. This apparatus comprises heat exchange means for elevating the temperature of the liquid cleansing medium, a mixing chamber downstream of the source of contaminated gas, a variable throat nozzle fed by the heat exchange means and designed to vaporize a portion of the heated liquid, atomize a portion of the heated liquid and eject a mixture of steam and atomized droplets into the mixing chamber at high velocity, and means located downstream of the mixing chamber for separating the contaminant-containing liquid from the clean gas.

According to yet another aspect of this invention, the flow rate of the liquid cleansing medium is varied by acting on the throat area of the nozzle to control the mass of liquid introduced into the contaminated gas. In this manner, the nozzle is used to control the gas cleaning efficiency, for example, in response to variations in gas flow rate, contaminant concentration, or contaminant particle size.

According to yet another aspect of this invention, the flow rate of the liquid cleansing medium is varied by acting on the throat area of the nozzle to control the temperature of the liquid leaving the heat exchanger and thereby avoiding premature flashing of the liquid.

According to yet another aspect of this invention, the nozzle is used to vary the flow rate of the liquid, and hence the draft developed by the inventive system to maintain the temperature of the gas in the system within acceptable limits.

According to yet another aspect of this invention, the flow rate of the liquid is regulated by the nozzle to affect the pressure in the industrial furnace to meet varying processing conditions.

According to yet another aspect of this invention, the nozzle is used to vary the flow rate of the liquid under changing nozzle inlet temperature conditions to maintain a relatively constant mass of liquid introduced into the gas stream, thereby maintaining a relatively constant gas cleaning efficiency.

According to still a further aspect of this invention, the heat exchanger for elevating the temperature of the liquid cleansing medium is located in the gas stream. This arrangement is useful only when the contaminated gas is hot, but under such conditions, the inventive system can be operated with substantially no additional energy input.

DETAILED DESCRIPTION OF THE DRAWINGS

Figure 1:
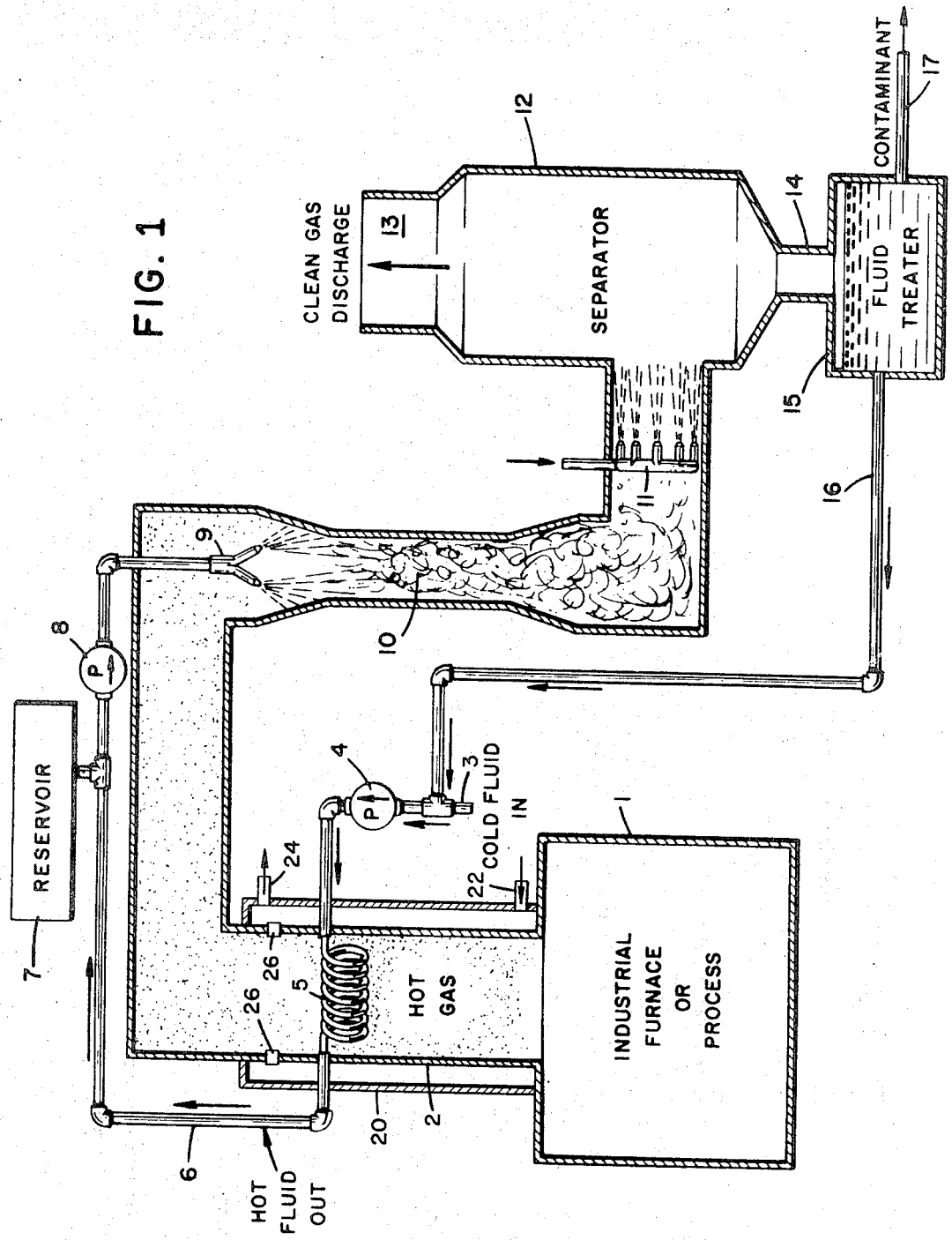
FIG. 1 is a schematic flow diagram of the overall aspects of the process of the invention.

Referring to FIG. 1, illustrating the invention in an environment in which the contaminated gases are at an elevated temperature, the industrial furnace or process 1 represents any furnace or process in which hot contaminant-containing gas is produced either as a primary or secondary product. Exemplary are processes in which heat is applied to basic materials which is to be melted and combined with other substances or purified and refined. Falling within this class are processes for steel production, for example, processes utilizing basic oxygen steel furnaces, blast furnaces, and electric steel furnaces of from about 25 to greater than 200 tons of steel capacity or foundary cupolas, or the refining and purification of nonferrous metallic ores, such as titanium, or processes for the production of glass. The contaminants contained in the hot gases produced from the above processes are particulate materials, such as metallic particles and oxides, and also gaseous contaminants of many types.

Gas ducting 2 is provided so that the hot industrial gases may be drawn away from the furnace or processing vessel. If desired, and as disclosed in my U.S. Pat. No. 3,704,570, a cooling jacket 20 can be provided around the gas ducting 2. A suitable cooling liquid, such as water, can then be introduced to the cooling jacket at 22, circulated around the ducting to lower the temperature of the hot gas emerging from the furnace, and extracted from the jacket 20 at 24. If the cooling liquid is used as the cleansing medium, the cleansing medium is thereby preheated. The water of other liquid for this cooling jacket can be supplied from an external source, and after it has performed its cooling function, can be passed through heat exchanger tubes located in the hot gas stream or returned and added to the fluid emerging from the bottom of the separator. The upper portion of the cooling jacket 20 can be made to associate with openings 26 formed around the periphery of the gas ducting. The cooling liquid in the jacket 20 then enters the stream of gas through openings 26 and quenches the hot gas. The quenching liquid is vaporized by the hot gas and hence need not be collected.

Energy contained in the high temperature gases in ducting 2 is transferred to a liquid cleansing medium by means of indirect heat exchanger 5. The indirect heat exchanger can be of any commerically available configuration having a surface area to sufficiently elevate the liquid temperature at the design flow rates for the particular system application. A liquid pump 4 is provided to force the liquid through indirect heat exchanger 5 at least in part from a source indicated generally as 3. Liquid pump 4 is preferably of the type which provides a constant pressure output at varying liquid flow rates. The heat exchange medium can be any liquid commonly used as such and is selected from a consideration of the particular process parameters present in the system together with the properties of the liquid such as heat capacity, vapor pressure, etc., as is well understood by those skilled in the art. For example, the liquid can be water, freon, etc. However, because of the availability and desirable properties of water, the invention will hereinafter be described with reference to water as the heat exchange medium.

Energy contained in the high temperature gas which, for example, can be from about 200° to 5000°F., is transferred to the water through the indirect heat exchangers. The temperature of the water exiting from the indirect heat exchanger depends, among other things, on its flow rate. The heated water flows from the indirect heat exchanger 5 through transfer means 6 and is stored for later use in the reservoir 7, or is delivered by a water pump 8 directly to variable throat nozzle 9, one embodiment of which is shown in greater detail in FIG. 3. After exiting the nozzle 9 at high velocity, the cleansing medium is mixed with the contaminated gas in a mixing chamber 10.

Figure 2:
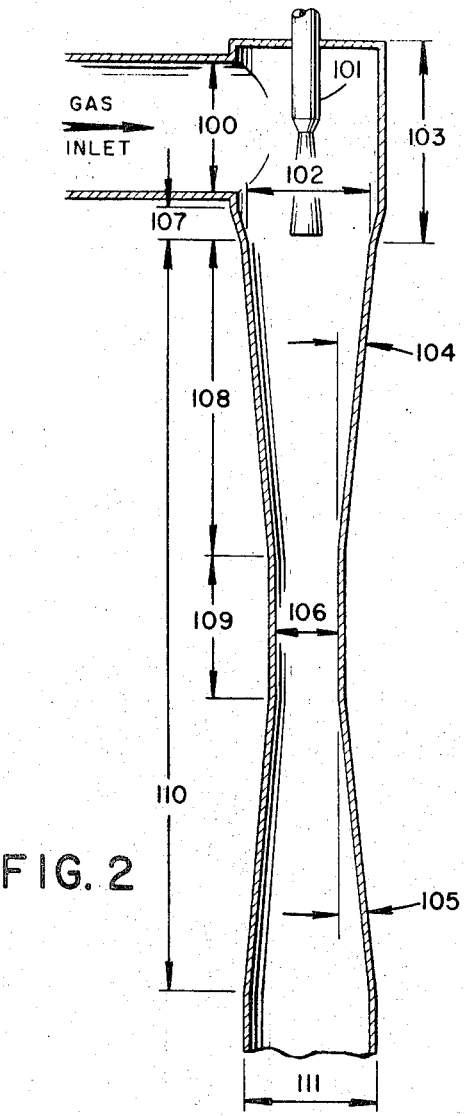
FIG. 2 is a schematic representation of one arrangement of variable throat nozzle and mixing chamber.
Figure 3:
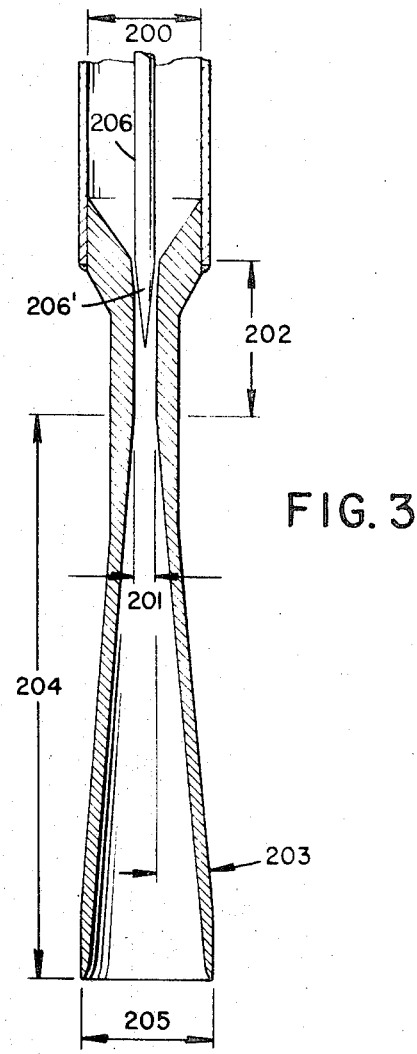
FIG. 3 is a schematic representation of the details of one particular variable throat nozzle.

The geometry and association of a typical variable throat nozzle and mixing chamber can be seen in FIGS. 2 and 3, the fixed geometry dimensions of which are determined by the volume flow of gas to be treated, the type of contaminants in the gas, and the degree of cleaning necessary or desirable. Mixing chamber 10 is illustrated as being venturi-shaped (constant pressure), but could take any other shape, such as cylindrical (constant area). The velocity of the accelerated cleansing medium injected into the mixing chamber preferably produces pressure shock waves which are believed to enhance the mixing action between the water droplets and the contaminated gas. In general, the requisite droplet velocity and mixing are attained in apparatus having a ratio of nozzle exit area to nozzle throat area of from about 1 to about 200 and the ratio of mixing chamber throat area to nozzle throat area of from about 50 to about 10,000. The fixed geometry dimensions of the nozzle and mixing chamber are designed so that the ratios of nozzle exit area to nozzle throat area and mixing chamber throat area to nozzle throat area are within these ranges. It should also be noted that the variable throat nozzles can be either a single nozzle similar to that shown in FIGS. 2 and 3, or a cluster of several nozzles as shown in FIG. 1.

The water flowing from pump 8 passes through the variable throat nozzle shown generally at 101 (FIG. 2), while contaminant-containing gas passes through ducting 100 after circulating by the indirect heat exchanger 5 (FIG. 1). The water from the indirect heat exchanger enters the nozzle through inlet 200 (FIG. 3), passes through throat 202 and the expanding portion of the nozzle shown as 204, and then travels through the exit shown at 205. Because of the temperature and pressure of the water and the apparatus dimensions, at least a portion of the water is converted to steam in the expanding section 204 of the nozzle 101, and a portion is atomized and accelerated to high velocity by the expansion accompanying the steam formation. The nozzle should be constructed in accordance with conventional techniques so that the flow of water through nozzle inlet 200 and nozzle throat 202 is relatively smooth and so that cavitation is avoided. For unless cavitation is prevented, the partial vacuums formed in the water by cavitation could result in sudden pressure drops below saturation leading to premature and undesirable flashing of the liquid in nozzle inlet 200 or nozzle throat 202.

The throat area of the nozzle 101 is varied by positioning a contoured plug 206 in the minimum cross-sectional area of the nozzle, namely, nozzle throat 202. Axial motion of plug 206 increases or decreases the effective minimum cross-sectional area. Since nozzle throat 202 is typically cylindrical in shape, an annular gap is formed between the inner wall of the nozzle throat 202 and plug 206 which is variable in size depending upon plug position. Variation in the nozzle's minimum cross-sectional area allows more or less water to pass through the nozzle and, accordingly, regulates the flow rate of the water. Nozzle throat 202 is sized for the maximum water flow rate required. Preferably, tip 206' of plug 206 is so contoured that the relationship between the axial movement of plug 206 and the change in flow rate of the water through the nozzle is linear. This linear response is obtained, for example, when top 206 is conical in shape as depicted. Other liquid flow response characteristics can be obtained by changing the contour of plug tip 206. If desired, the plug 206 can be so positioned such that the flow of water through the nozzle is completely stopped.

As noted previously, numerous of the process variables can be controlled by means of the present invention. Specifically, this control is accomplished by varying the throat area of the nozzle. The process variables to be controlled are, for the most part, interrelated, and the dependency of one upon the others tends to be complex. The following discussion outlines the dependency between the process variables, the method for accomplishing the control of these variables, and come exemplary parameters for understanding the operation of the present invention.

The velocity of the water droplet depends upon the ratio of the nozzle throat area to the nozzle exit area, the mixing chamber dimensions, the pressure of the water upstream of the nozzle, the amount of fluid converted to vapor, and the water temperature. For a given nozzle and mixing chamber geometry and for a constant inlet water pressure, the droplet velocity varies directly with water temperature. For best operation in the invention, the droplet velocity should be at least about 200 ft./sec. greater than the velocity of the gas stream, and more preferably, at least about 700 ft./sec. greater.

The expansion accompanying the formation of vapor as the fluid exits the nozzle, the configuration of the mixing chamber, and the pressure shock waves created in the mixing chamber create a region of reduced pressure in the vicinity of the nozzle relative to the pressure in the industrial furnace. The region of reduced pressure results in the development of a pressure differential which causes the gas to be sucked from the furnace without the provision of a fan. Thus the inventive system is designed to impose the pressure differential required to remove the quantity of gas produced by the furnace within a broad general range, with the fine control of the gas flow rate being accomplished by adjusting the mass of water issuing from the nozzle.

The temperature, pressure and flow rate of the water, the fixed geometry of the nozzle including exit area and maximum throat area, and the dimensions of the mixing chamber are initially determined based upon a knowledge of the industrial gases and contaminants. The operation of the system is thereafter primarily controlled by controlling the flow rate of the water through the nozzle by means of a movable plug 206.

In general, the volume of water employed is not a critical parameter, and water flow rates within the range of from about 1 to 3000 gal./min. are effective. However, the ratio of the weight of gas to the total weight of water employed should be controlled to some extent. For most systems, the gas to water ratio will fall within the range of from about 0.5 to about 5.0 and more preferably from about 1.5 to about 3.5, with the volume of water varying directly with gas flow and concentration, and inversely with contaminant particulate size.

The variable throat nozzle is useful to vary the water flow rate in response to variations in gas flow, contaminant concentration or contaminant particle size. Gas flow rate varies directly with water flow rate, with the gas flow changing proportionally less than the water flow. Accordingly, an increase in the water flow rate will cause a decrease in the gas to water ratio. Therefore, if it is desired to keep the gas to water mass ratio constant and the gas flow increases, the water flow rate can be increased until the mass ratio of gas to water decreases to its desired level. When the gas flow rate decreases to its desired level, the water flow rate can then be decreased to maintain the wanted mass ratio. In like manner, the water flow rate can be increased in response to increased contaminant concentration or decreased contaminant particle size. In this manner, the gas cleaning efficiency can be maintained relatively constant even with fluctuations in system parameters.

Another process variable which can be controlled by adjusting the throat area of the nozzle is the temperature of the water cleansing medium. For several reasons, it is important to maintain control over the temperature of the water, three of which warrant specific mention. First, it is important to balance the temperature and pressure of the water such that from about 5 to about 20 weight percent, and preferably about 15 percent, of the water fed to the nozzle is converted to vapor. For in this manner, and accounting for the total apparatus configuration, the desired water droplet velocity can be attained. In this regard, it should be noted that any number of temperature and pressure combinations could be used to accomplish the desired conversion of the water to vapor. In general, it has been found that water pressures of from about 50 to 700 psia and water temperatures of about from 220 to 500°F. are adequate, but are of course not limiting. Conveniently, the water pressure is maintained relatively constant by the use of a fixed pressure pump 4, and with the present invention the water temperature can be maintained constant by varying the water flow rate through the heat exchanger 5 by adjusting the throat area of the nozzle.

A second reason for controlling the water temperature is to avoid possible damage to the processing equipment. The temperature stress limitations built into the processing equipment are initially determined by considering the normal operating temperature of the cleansing water which will yield the desired gas cleansing efficiency, and the highest expected water temperature. If the inventive system is used to clean hot gases and employs an in-stream heat exchanger for the water cleansing medium, increases in the gas temperature would result in elevated temperatures of the water. Accordingly, unless the water temperature is monitored and controlled, damage to the equipment could result.

Thirdly, the water temperature is advantageously controlled to avoid premature flashing. As the temperature of a liquid increases, its saturation pressure decreases. Therefore, if the temperature of the cleansing water should increase without an appropriate increase in the pressure, premature flashing could occur, the operation of the system would be adversely affected, and the integrity of the processing equipment could be endangered.

A further process variable which can be controlled by the use of the variable throat nozzle of the present invention is the temperature of the gas in the system when the contaminated gas emerges from the source at an elevated temperature. Construction materials limit the maximum temperature of hot gas which can be passed through ducting 2. Accordingly, it is desirable to be able to vary the gas temperature and particularly to decrease it when appropriate. The gas temperature, as should be evident, can be reduced by increasing the rate at which the gas is removed from the industrial furnace. And since the gas flow rate is primarily influenced by the rate at which the cleansing medium exits the nozzle, the temperature of the gas can be adjusted by varying the throat area of the nozzle. For example, if the temperature of the gas rises to an unacceptable level, the temperature can be decreased by opening the throat of the variable throat nozzle, increasing the water flow rate through the nozzle and, in turn, increasing the gas flow rate from the source.

Still another process variable which can be controlled by the use of the variable throat nozzle is the pressure of the industrial furnace or process 1. The furnace pressure, like the gas temperature, varies inversely with the flow rate of gas through the system. Accordingly, the flow rate of the gas can be similarly controlled by varying the rate at which the water exits the variable throat nozzle. This control or adjustment of furnace pressure may be desirable, for example, if it ever becomes necessary to conduct an industrial process at varying pressures. The pressure at the furnace or process 1 can, for example, be decreased by increasing the flow of water through the variable throat nozzle.

Still another process variable which is conveniently controlled by means of the present invention is the flow rate of the water exiting the nozzle. This variable is itself advantageously monitored and controlled for several reasons, one of which warrants specific discussion.

In many gas cleaning processes, the temperature of the off-gas varied considerably. And as the flow rate of a liquid through a nozzle varies inversely with the temperature of the liquid (varying orifice coefficient), this drastic change in the temperature of the process could significantly affect the operation of the cleaning apparatus. With the present invention, this undesirable phenomenon can easily be prevented. The flow rate of water through the nozzle can easily be held constant, even under varying inlet water temperature conditions, by increasing the nozzle throat area when the water temperature rises and decreasing the throat area when the water temperature falls. By maintaining a relatively constant water flow rate, the gas cleaning efficiency is thereby kept relatively constant.

Figure 4:
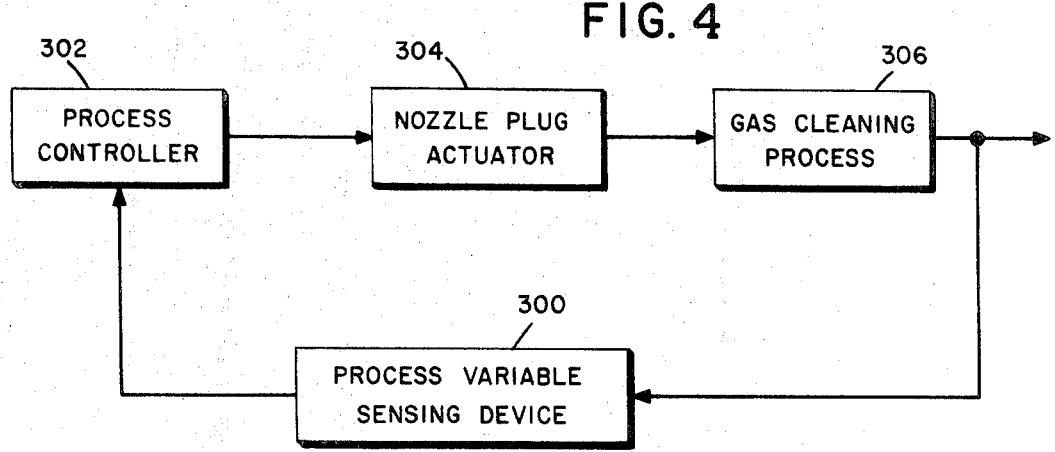
FIG. 4 is a schematic representation of an exemplary automatic control means for controlling the throat area of the nozzle.

With reference now to FIG. 4, a feedback control loop for varying the throat area of the nozzle in response to a variation in any one of the above-mentioned process variables will be described.

A control variable such as the water temperature, the water flow rate, the gas temperature of the industrial furnace pressure is measured by a conventional sensing device 300. In the case where temperature is sensed, the temperature reading is converted into a mechanical movement, pressure or an electrical voltage. A bimetallic strip, a closed bulb and capillary fluid system or a conventional thermocouple are contemplated. In the case of measuring water flow rate, any conventional flow measuring instrument can be used, and similarly, any conventional pressure sensor and transducer can be employed when the industrial furnace process pressure is to be monitored.

A process controller 302 receives a signal from the control variable sensing device 300 and compares this signal with a preset reference signal which can, for example, be manually set. The process controller 302 then generates a correction signal for eliminating or reducing the measured difference between the signal received from the sensing device 300 and the reference signal. When the temperature of the water or gas is monitored, the reference signal corresponds to the temperature at which it is desired to maintain these variables. In the case of water flow rate, the reference signal will represent the flow rate at which it is desired to maintain the water flow. When it is desired to maintain the gas cleaning efficiency substantially constant with changes in gas flow rate, contaminant concentration or contaminant particle size, the reference signal will represent the desired increase or decrease in water flow rate. In like manner, the reference signal will represent the pressure at which it is desired that the industrial furnace be maintained or to which it is desired that the industrial furnace be adjusted.

The process controller 302 can be of any conventional design, such as an electric, hydraulic or pneumatic controller. By way of example, the process controller 302 can be a pneumatic controller of the type in which the reference signal and measured signal are introduced in the form of air pressures (e.g., between 3 and 15 psig) into bellows at one end of a pivoted beam. The forces exerted by the reference and measured pressures, in such a system, would oppose each other such that the beam is pivoted by the pressure differential. The other end of the beam could be made to cooperate with a nozzle arrangement to increase or decrease the air flow from the signal air supply and the air signal pressure upstream of the nozzle arrangement. The air signal pressure could then be transmitted to a spring-biased feedback bellows to oppose the pivoting of the beam. Accordingly, the air signal pressure at the output of the process controller 302 would be proportional to the deviation of the measured value from the preset reference.

A nozzle plug actuator 304 associates with and receives control signals from the process controller 302. This actuator 304 can also be of any conventional design and can, for example, be electrically, hydraulically or pneumatically operated. By way of illustration, the nozzle plug actuator 304 can be a pneumatic actuator in the form a a spring-biased diaphragm to which the nozzle plug 206 is attached. An air signal (e.g., between 3 and 15 psi) from the process controller 302 could be made to exert a force on the diaphragm to move the diaphragm and attached nozzle plug 206 against the spring force thereby displacing the nozzle plug 206 with respect to the nozzle throat 202. Accordingly, the air signal pressure from the process controller 302 would determine the minimum throat area of the nozzle and the area of the opening for the water stream.

The throat area of the nozzle, as set by the nozzle plug actuator 304, determines the water flow rate through the nozzle. The water flow rate, in turn, controls the variable process parameters of the gas cleaning process indicated by the number 306. In this manner, a full control loop is developed. A change in the water flow rate causes a change in the process variable being monitored. This variable is, in turn measured by the sensing device 300 and a signal is transmitted to the process controller 302. The process controller 302 then controls the water flow rate to ensure that the measured value of flow is equal to the desired flow rate represented by the reference value set in the process controller 302.

The process controller 302 and nozzle plug actuator 304 have generally been described as infinite control devices. However, if a two position plug arrangement, namely, a minimum and maximum flow arrangement, provides sufficient flexibility to respond to the changes in the process variable, then the feedback control loop can be simplified. For example, the process controller 302 could take the form of a simple transducer, for example, a switch that makes or breaks a contact in an electric circuit. The nozzle plug actuator could then take the form of a solenoid-operated pneumatic value, for example, to control the movement of a spring-biased diaphragm. And of course, the nozzle plug movement could be controlled manually by means, for example, of a rotatable threaded shaft attached to a fixed nut-like arrangement.

The variable throat nozzle of the present invention can also be used in the process of my U.S. Pat. No. 3,704,570. This patent related, in part, to an industrial process in which combustible gases are present in the hot gas generated by an industrial furnace or process. In this patent, the gases discharged from the industrial furnace are mixed with externally supplied oxygen (e.g., air) and are ignited by suitable means, for example, a pilot burner fueled externally. The heat given off by the combustion of the combustible gases and oxygen is used to heat the water passing through the indirect heat exchanger. The heated water is then introduced into the hot gas stream through the ejector nozzle which, in the present context, would be a variable throat nozzle.

Referring back to FIG. 1, further aspects of the present invention will be described. The mixture of atomized liquid, vaporized liquid, and hot gas exiting from the mixing chamber can optionally be contracted with a coolant which is either the same as or different from the liquid used as the heat exchange medium. The coolant is sprayed into the gas ducting, for instance, through a cluster of nozzles, as is shown at 11. In systems recycling the heat exchange medium to conserve operating costs, it is desirable to reduce the temperature of the mixture to reduce the loss of cleansing liquid. In general, where water is employed as the heat exchange medium it is desirable to reduce the temperature to from about 120° to 200°F.; in this way only about 10 percent of the water remains as vapor and is thus lost to the atmosphere.

The mixture of liquid cleansing medium and contaminated particles is then passed to a separator 12 wherein the water droplets containing the contaminants are separated from the gas stream so that the gas may be discharged to the atmosphere through duct 13 or to further processing equipment. The water separator can be of any conventional type.

The contaminated water is removed from the separator through opening 14 and is either discharged or passed to further treatment, depending upon the desired economics of the process. Foe example, the contaminated water can be passed to a liquid treater shown at 15 wherein the contaminants are removed from at least a portion of the water. The clean water could then be recycled through pump 4, with makeup water being added from the source 3 as required. The liquid treating apparatus can be any commercially available equipment comprising, for example, a system of filters and settling basins, etc.

Other aspects of this invention will be apparent from a consideration of the following specific discussion, given for exemplary purposes, and not intended to be limiting in any manner.

EXAMPLE

In the production of steel employing an electric-arc furnace of 25 ton steel capacity, gas is discharged at about 2000°F. at a flow rate of about 28,000 actual cubic feet per minute. Th contaminants contained in the gas include ferric oxide, dolomite, zinc, copper and other trace metallic elements. Water is employed as the heat exchange medium and is supplied by a constant output pressure pump. The water pressure to the nozzle is 350 psia. Referring to FIG. 1, the gas ducting 2 is 4.0 feet in diameter and the heat exchanger 5 is of simple tube-type design with normal 1-inch diameter tubes. Referring to FIGS. 2 and 3, the dimensions of the mixing chamber and the fixed geometry dimensions of the nozzle and plug are given in the following table:

TABLE

| Reference Numeral from FIGS. 2 and 3 | Dimension |
|---|---|
| 100 | 4.0' |
| 103 | 5.0' |
| 104 | 5° |
| 105 | 10° |
| 106 | 17" |
| 107 | 1' |
| 110 | 17' |
| 111 | 34' |
| 200 | 3" |
| 201 | 0.4" |
| 202 | 2" |
| 203 | 5° |
| 205 | 2.3" | wherein ' is feet, " is inches, and ° is degrees. The mixture issuing from the mixing chamber is treated as described above.

The total stroke of the plug is 1.5 inches. The stem of the plug is so contoured that the relationship between the axial movement of the plug and the change in flow rate of the water through the nozzle is essentially linear. The flow rate of the water varies between about 25 and 75 gal/min for a complete stroke of the plug. The plug is initially set for a flow rate of 50 gal/min. At this flow rate, the water temperature at the nozzle inlet is 400°F.

The velocity of the water droplets so formed is 1000 ft/sec thereby creating a region of reduced pressure in the vicinity of the nozzle of 14.40 psia relative to the pressure existing in the electric-arc furnace of about 14.7 psia. This induced pressure differential of 0.3 psia causes the gas to flow from the furnace at the above rate of 28,000 actual cubic ft/min which is thus equal to a gas velocity in the vicinity of the nozzle of 200 ft/sec. The water droplets thus travel at a velocity of 800 ft/sec greater than the velocity of the gas contaminants thereby entrapping the contaminants carried by the gas stream such that the gas discharged to the atmosphere contains less than about ½ percent of the contaminants in the gas before treatment.

The water temperature is maintained constant as follows. The temperature of the gas being discharged from the electric-arc furnace rises to about 2100°F. This causes the water temperature at the nozzle inlet to rise to about 425°F. This temperature rise is detected by process variable sensing device, and transmitted to the process controller. The process controller sends an appropriate signal to the nozzle plug actuator which in turn moves the plug 0.15 inches to further open the nozzle throat. The flow rate of water through the nozzle is thereby increased to 5 gal/min. The water temperature at the inlet to the nozzle is hence decreased to 400°F., its original level. This cycle is continuously repeated with changes in the temperature of the gas being discharged from the electric-arc furnace.

What is claimed is:

1. An apparatus for drawing contaminated gases from a source without the provision of a fan and for removing contaminant particles therefrom, the apparatus comprising in combination:
    ducting connected to said source for delivering said contaminated gases to a discharge region;
    a source of a cleansing medium in its liquid state;
    heat exchange means for heating said cleansing medium;
    nozzle means for receiving the heated cleansing medium in its liquid state and for converting a portion of the heated liquid cleansing medium into vapor and a portion of the heated liquid cleansing medium into atomized droplets such that the atomized droplets are accelerated by the expansion accompanying the vapor formation and are discharged from the nozzle means at an exit velocity at least 200 feet per second greater than the velocity of the contaminated gases;
    means for varying the throat area of said nozzle means for controlling the flow rate of said heated liquid cleansing medium through the nozzle means while maintaining the conversion of the heated liquid cleansing medium into vapor and atomized droplets;
    a mixing chamber located downstream of said nozzle means and intermediate said source and said discharge region for mixing the accelerated cleansing medium discharged from said nozzle means with the contaminated gases, thereby entrapping the contaminated particles in the cleansing medium and thereby developing a region of reduced pressure of such a magnitude as to draw the contaminated gases from said source toward said discharge region without the provision of a fan;
    separator means located downstream of said mixing chamber for separating the cleansing medium containing the contaminant particles from the cleansed gases; and
    discharge means in said discharge region for discharging substantially contaminant-free gas to the atmosphere.

2. The apparatus of claim 1 in which the means for varying the throat area of the nozzle means is a plug which is moveable into and out of the throat of said nozzle means.

3. The apparatus of claim 1 and further comprising means for sensing a change in a variable parameter of the liquid cleansing medium and for changing the throat area of the nozzle means in response thereto.

4. The apparatus of claim 1 and further comprising means for sensing a change in a variable parameter of the contaminated gases and for changing the throat area of the nozzle means in response thereto.

5. The apparatus of claim 1 and further comprising means for sensing a change in a variable parameter of the source of contaminated gases and for changing the throat area of the nozzle means in response thereto.

6. The apparatus of claim 1 wherein said contaminated gases are hot and further comprising a cooling duct for cooling the hot comtaminated gases.

7. The apparatus of claim 1 wherein said contaminated gases are hot and further comprising quenching means for injecting a spray of liquid into the stream of hot gases.

8. The apparatus of claim 1 and further comprising control means for sensing a variable parameter of the system and for varying the throat area of said nozzle means to maintain a predetermined gas cleaning efficiency notwithstanding variations in gas flow, contaminant concentration or contaminant particle size.

9. The apparatus of claim 1 and further comprising means for sensing the temperature of the heated liquid cleansing medium which enters the nozzle means, and for verying the throat area of the nozzle means so as to maintain constant the temperature of the liquid cleansing medium.

10. The apparatus of claim 1 further comprising means for sensing the temperature of the contaminated gas exiting the source, and for varying the throat area of the nozzle means so as to maintain constant the temperature of such contaminated gas.

11. The apparatus of claim 1 and further comprising means for sensing the pressure in said source, and for varying the throat area of the nozzle means so as to regulate the pressure in said source in accordance with a predetermined pressure schedule.

12. The apparatus of claim 1 and further comprising means for sensing the temperature of the contaminated gas exiting the source, and for varying the throat area of the nozzle means so as to maintain constant the volume of cleansing liquid passing through the nozzle means.

13. A method for drawing contaminated gases from a source through ducting and for removing contaminant particles therefrom, the method comprising the steps of:

heating a liquid cleansing medium;

introducing the heated cleansing medium in its liquid state into nozzle means having a variable throat area for controlling the flow rate of the heated cleansing medium through the nozzle means under conditions of temperature and pressure such that a portion of the heated liquid cleansing medium is converted into vapor, a portion of the heated liquid cleansing medium is converted into atomized droplets, and the atomized droplets are accelerated by the expansion accompanying the vapor formation at an exit velocity at least 200 feet per second greater than the velocity of the contaminated gases;

varying the throat area of said nozzle means for controlling the flow rate of said heated liquid cleansing medium through the nozzle means while maintaining the conversion of the heated liquid cleansing medium into vapor and atomized droplets;

mixing the accelerated cleansing medium with the contaminated gases in a mixing chamber located downstream of the nozzle means, thereby entrapping the contaminant particles in the accelerated cleansing medium and thereby developing a region of reduced pressure of such a magnitude as to draw the contaminated gases from the source toward the mixing chamber without the provision of a fan;

separating the cleansing medium containing the contaminant particles from the contaminated gases, thereby producing a stream of substantially contaminant-free gas; and discharging the substantially contaminant-free gas to the atmosphere.

14. The method of claim 13 including the further step of sensing a change in a variable parameter of the heated liquid cleansing medium and changing the throat area of the nozzle means in response thereto.

15. The method of claim 13 including the further step of sensing a change in a variable parameter of the contaminated gases and changing the throat area of the nozzle means in response thereto.

16. The method of claim 13, including the step of sensing a change in a variable parameter of the source of contaminated gases and changing the throat area of the nozzle means in response thereto.

17. The method of claim 13 wherein the contaminated gases are hot and including the step of cooling the contaminated gases as they emerge from said source.

18. The method of claim 13 wherein the contaminated gases are hot and including the step of quenching the contaminated gases as they emerge from said source by injecting a spray of liquid into the stream of hot gases.

19. The method of claim 13 and further ocmprising the steps of: sensing a variable parameter of the system; and varying the throat area of said nozzle means to maintain a predetermined gas cleaning efficiency notwithstanding variations in gas flow, contaminant concentration or contaminant particle size.

20. The method of claim 13 and further comprising the steps of: sensing the temperature of the heated liquid cleansing medium which enters the nozzle means; and varying the throat area of the nozzle means so as to maintain constant the temperature of the liquid cleansing medium.

21. The method of claim 13 and further comprising the steps of: sensing the temperature of the contaminated gas exiting the source; and varying the throat area of the nozzle means so as to maintain constant the temperature of such contaminated gas.

22. The method of claim 13 and further comprising the steps of: sensing the pressure in said source; and varying the throat area of the nozzle means so as to regulate the pressure in said source in accordance with a predetermined pressure schedule.

23. The method of claim 13 and further comprising the steps of: sensing the temperature of the contaminated gas exiting the source; and varying the throat area of the nozzle means so as to maintain constant the volume of cleansing liquid passing through the nozzle means.

24. An apparatus for drawing hot contaminated gases from a source and for removing contaminant particles therefrom, the apparatus comprising in combination:

ducting connected to said source for delivering said contaminated gases to a discharge region;

indirect heat exchange means located in said ducting for heating a liquid cleansing medium;

nozzle means for receiving the heated cleansing medium in its liquid state, and for converting a portion of the heated liquid cleansing medium into vapor and a portion of the heated liquid cleansing medium into atomized droplets such that the atomized droplets are accelerated by the expansion accompanying the vapor formation and are discharged from the nozzle means at an exit velocity at least 200 feet per second greater than the velocity of the contaminated gases;

means for changing the throat area of said nozzle means in response to a change in a variable parameter upstream of said nozzle means for controlling the flow rate of said heated liquid cleansing medium through the nozzle means while maintaining the conversion of the heated liquid cleansing medium into vapor and atomized droplets;

pump means for pumping the liquid cleansing medium through the indirect heat exchange means and to the nozzle means such that the nozzle means inlet pressure is above the saturation pressure of the heated liquid cleansing medium;

a mixing chamber located downstream of said nozzle means and intermediate said source and said discharge region for mixing the accelerated cleansing medium discharged from said nozzle means with the contaminated gases thereby entrapping the contaminated particles in the accelerated cleansing medium and thereby developing a region of reduced pressure of such a magnitude as to draw the contaminated gases from said source toward said discharge region without the provision of a fan;

separator means located downstream of said mixing chamber for separating the cleansing medium containing the contaminant particles from the contaminated gases; and discharge means in said discharge region for discharging substantially contaminant-free gas to the atmosphere.

25. A method for drawing hot contaminated gases from a source through ducting and for removing contaminant particles therefrom, the method comprising the steps of:
heating a liquid cleansing medium by indirectly heat exchanging the liquid cleansing medium with the contaminated gases;
introducing the heated cleansing medium in its liquid state into nozzle means at a pressure above the saturation pressure of the heated cleansing medium under conditions of temperature and pressure such that a portion of the heated liquid cleansing medium is converted into vapor, a portion of the heated liquid cleansing medium is converted into atomized droplets, and the atomized droplets are accelerated by the expansion accompanying the vapor formation at an exit velocity at least 200 feet per second greater than the velocity of the contaminated gases;
controlling the flow rate of the heated cleansing medium through nozzle means by varying the throat area of the nozzle means while maintaining the conversion of the heated liquid cleansing medium into vapor and atomized droplets;
mixing the accelerated cleansing medium with the contaminated gases in a mixing chamber located downstream of the nozzle means, thereby entrapping the contaminant particles in the accelerated cleansing medium and thereby developing a region of reduced pressure of such a magnitude as to draw the contaminated gases from the source toward the mixing chamber without the provision of a fan;
separating the cleansing medium containing the contaminant paritcles from the contaminated gases, thereby producing a stream of substantially contaminant-free gas; and
discharging the substantially contaminant-free gas to the atmosphere.

26. The method of claim 25 in which the temperature of the heated cleansing medium is controlled by increasing the flow rate through the nozzle means when the temperature of said heated cleansing medium rises and decreasing the flow rate when the temperature falls.

27. The method of claim 25 in which the temperature of the contaminated gas is controlled by increasing the flow rate through the nozzle means when the temperature of said contaminated gas rises and decreasing the flow rate when the temperature falls.

28. The method of claim 25 in which the gas cleaning efficiency is controlled by increasing the flow rate through the nozzle means when the particle size of the contaminated particles in the contaminated gas decreases and decreasing the flow rate when the particle size increases.

29. The method of claim 25 in which the gas cleaning efficiency is controlled by increasing the flow rate through the nozzle means when the contaminant concentration in the contaminated gas increases and decreasing the flow rate when the contaminated concentration decreases.

30. The method of claim 25 in which the pressure at the source is controlled by increasing the flow rate through the nozzle means when the pressure at the source rises and decreasing the flow rate when the pressure falls.

31. The method of claim 25 in which the flow rate of water through the nozzle means is controlled by increasing the flow rate through the nozzle means when the water temperature rises and decreasing the flow rate when the temperature falls.

* * * * *